United States Patent [19]

Takamiya: Makoto et al.

[11] Patent Number: 5,327,222
[45] Date of Patent: Jul. 5, 1994

[54] DISPLACEMENT INFORMATION DETECTING APPARATUS

[75] Inventors: Takamiya: Makoto, Kawasaki; Kadowaki: Hidejiro, Yokohama; Ishida: Yasuhiko, Tokyo, all of Japan

[73] Assignee: Canon Kabushiki Kaisha, Tokyo, Japan

[21] Appl. No.: 164,846

[22] Filed: Dec. 9, 1993

Related U.S. Application Data

[63] Continuation of Ser. No. 799,093, Nov. 27, 1991, abandoned.

[30] Foreign Application Priority Data

Nov. 30, 1990 [JP] Japan .................... 2-333835

[51] Int. Cl.$^5$ .................................. G01B 11/02
[52] U.S. Cl. ....................... 356/356; 356/354; 356/28.5
[58] Field of Search .......... 356/356, 354, 28.5, 356/343, 336

[56] References Cited

U.S. PATENT DOCUMENTS 4,633,714  1/1987  Mazumder et al. ............... 356/336
4,948,257  8/1990  Kaufman et al. .................. 356/354

FOREIGN PATENT DOCUMENTS 0391278  3/1990  European Pat. Off. .

OTHER PUBLICATIONS

Laser Und Optoelektronik, vol. 17, No. 4, Dec. 1985, Stuttgart De pp. 362-375; B. Ruck et al; "Laser Doppler-Anemometrie".
Measurement Science & Technology vol. 1, No. 3, Mar.1990, Bristol GB pp. 265-271 X. Guo et al.: "A new LDA system utilising the optic-hybrid feedback technique".

*Primary Examiner*—Samuel A. Turner
*Assistant Examiner*—LaCharles P. Keesee, II
*Attorney, Agent, or Firm*—Fitzpatrick, Cella, Harper & Scinto

[57] ABSTRACT

A displacement information measuring apparatus comprising light emitting source for emitting two light fluxes, acoustic optical device for giving a predetermined frequency difference to the two light fluxes from the light emitting source, optical system having a diffraction grating upon which at least one light flux of two light fluxes having the predetermined frequency difference given by the acoustic optical device is vertically incident so that the light fluxes are diffracted, the optical system causing at least one light flux from the diffraction grating to be incident upon an object in which the displacement information is to be measured, and detector for performing a detection by interference of one light flux incident upon said object and emergent from said object with the other of the two light fluxes, the displacement information of the object being obtained from a beat signal corresponding to the frequency difference and obtained from the detector, wherein the optical system is constituted such that the frequency of the beat signal may not be substantially affected by a variation of wavelength of the light flux incident upon the diffraction grating.

15 Claims, 8 Drawing Sheets

F I G. 3
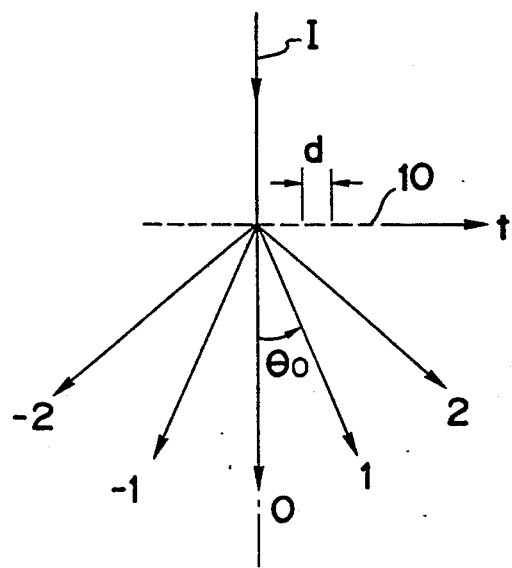

DISPLACEMENT INFORMATION DETECTING APPARATUS

This application is a continuation of application Ser. No. 07/799,093 filed Nov. 27, 1991, now abandoned.

BACKGROUND OF THE INVENTION

1. Field of the Invention

The present invention relates to a displacement measuring apparatus for measuring the displacement information of a moving object or fluid, and more particularly to a displacement measuring apparatus for measuring the information such as a velocity by detecting the deviation of frequency of a coherent light flux such as a laser beam.

2. Related Background Art

Conventionally, a laser Doppler velocimeter has been known as an apparatus for measuring the movement velocity of a moving object or fluid (thereinafter referred to simply as "moving object") in non-contact and at high accuracy. The laser Doppler velocimeter is an apparatus for measuring the movement velocity of a moving object by directing the radiation of a laser beam to the moving object and using an effect that the frequency of light scattered by the moving object deviates (or shifts) in proportion to the movement velocity, or a so-called Doppler effect.

One example of this conventional laser Doppler velocimeter is shown in FIG. 1. In the figure, 1 is a laser, 2 is a collimator lens, 3 is a parallel light flux, 4 is a beam splitter, 6 and 6' are reflecting mirrors, 7 is a moving object moving in the arrow direction at a velocity V, 8 is a focusing lens, and 9 is a photodetector.

In this constitution, a laser beam emitted from the laser 1 is made into the parallel light flux 3 through the collimator lens 2, and divided into two light fluxes 5 and 5' by the beam splitter 4. The two light fluxes 5, 5' are then reflected at the reflecting mirrors 6 and 6', respectively, and radiated onto the moving object 7 moving at a velocity V at an incident angle $\theta$, said two light fluxes overlapping. The light scattered by the moving object is detected via the focusing lens 8 by the photodetector 9. The frequencies of scattered lights from two light fluxes are subjected to the Doppler shifts of $+\Delta f$ and $-\Delta f$, respectively, in proportion to the movement velocity V of the moving object. Here, the wavelength of laser beam is $\lambda$, $\Delta f$ can be given by the following expression (1).

$$\Delta f = V \sin(\theta)/\lambda \qquad (1)$$

The scattered lights having undergone the Doppler shifts of $+\Delta f$ and $-\Delta f$, respectively, interfere with each other to cause a periodical variation of contrast on a light receiving plane of the photodetector 9. Its frequency F can be given by the following expression (2)

$$F = 2\Delta f = 2V \sin(\theta)/\lambda \qquad (2)$$

Hence, the velocity V of the moving object 7 can be obtained by measuring the frequency F (thereinafter referred to as Doppler frequency) of the photodetector 9 from the expression (2).

With the laser Doppler velocimeter such as the conventional example as above described, the Doppler frequency F is inversely proportional to the wavelength $\lambda$ of the laser beam. Accordingly, it was necessary to use a laser light source having a stable wavelength as the light source of the laser Doppler velocimeter. As the laser light source capable of continuous emission and having a stable wavelength, a gas laser such as a He-Ne laser is often used, but the laser oscillator main body is large and requires a high voltage, resulting in a large and expensive apparatus. On the other hand, a laser diode (or semiconductor laser) for use in a compact disk, a video disk or in optical fiber communication is very small and easy to drive, but has a problem that the temperature dependence exists.

FIG. 2 shows one example of the normal temperature dependence of a laser diode (quote from Mitsubishi semiconductor data book, 1987: optical semiconductor devices), in which a portion with continuously changing wavelength is mainly due to the temperature variation of the refractive index in the active layer of the laser diode, and is 0.05 to 0.06 nm/° C. On the other hand, a portion with discontinuously changing wavelength is referred to as a vertical mode hopping, and is 0.2 to 0.3 nm/° C.

In order to stabilize the wavelength, a method is generally adopted in which the laser diode is controlled to be maintained at a constant temperature. With this method, it is necessary to attach a temperature control member such as a heater, a radiator or a temperature sensor to the laser diode with a small thermal resistance so as to control the temperature at high accuracy. If this is used for the laser Doppler velocimeter, the apparatus is relatively large and yields high cost, and further the instability due to previously-mentioned vertical mode hopping can not be eliminated completely.

The present applicant has proposed a laser Doppler velocimeter to resolve this problem in European Patent Publication EP 0391278A. According to the method of this Doppler velocimeter (thereinafter referred to as "G-LDV method"), a laser beam from a light source such as a semiconductor laser is incident upon a diffraction grating, among obtained diffracted beams, two diffracted beams at the $+n$-th and $-n$-th order (n is 1, 2, ...) except for the zeroth order are radiated onto a moving object or flowing fluid at the same intersection angle as an angle made by the two light fluxes, and the scattered light from the moving object or flowing fluid is detected by a photodetector.

FIG. 3 is an example of diffraction when a laser light I is incident upon a transparent diffraction grating 10 having a grating pitch d, in a direction perpendicular to the grating arranging direction t, and the diffraction angle $\theta_0$ is given by the following expression.

$$\sin \theta_0 = m\lambda/d$$

Where m is a diffraction order (0, 1, 2, ...), and $\lambda$ is a wavelength of the light, in which the lights of the $\pm n$-th order except for the zeroth order can be represented by the following expression.

$$\sin \theta_0 = \pm n\lambda/d \qquad (3)$$

(n: 1, 2, ...)

FIG. 4 is a view in which two light fluxes of the $\pm n$-th order are radiated onto a measured object 7 with mirrors 6, 6' so that the incident angle may be $\theta_0$. The Doppler frequency F of the photodetector 9 is given by:

$$F = 2V \sin \theta_0/\lambda = 2nV/d \qquad (4)$$

from the expressions (2) and (3). Therefore, the frequency F is inversely proportional to the grating pitch d of the diffraction grating 10, and proportional to the velocity of the measured object 7, not depending on the laser light I. Since the grating pitch d can be sufficiently stable, the Doppler frequency F can be obtained only in proportion to the velocity of the measured object 7. If the diffraction grating 10 is a reflection type, the same effects can be obtained.

Generally, if a high coherent light such as a laser beam is radiated onto an object, the scattered light due to irregularities of object surface undergoes a random phase modulation, forming spot patterns, i.e., so-called speckle patterns on the observation plane. In the laser Doppler velocimeter, if the moving object is moved, the variation of contrast by the Doppler shift on a detection plane of the photodetector is modulated by irregular variations of contrast due to flow of speckle patterns, and the output signal of the photodetector is also modulated by the variation of transmittance (or reflectance) of measured object.

The G-LDV method as previously described is generally carried out in such a way that the output of the photodetector is passed through a high-pass filter to remove low frequency components electrically in order to pick up only Doppler signals, because the frequency of the variation of contrast due to the flow of speckle patterns and the frequency of the variation of transmittance (or reflectance) for the moving object are generally a low frequency in comparison with the Doppler frequency as shown in the expression (4). But, if the Doppler frequency is low due to a slower velocity of the measured object, the frequency difference with respect to low frequency variation components is smaller, resulting in a problem that the high-pass filter can not be used and the velocity of the measured object can not be measured. Further, the movement direction can not be detected in principle.

Thus, the present applicant has proposed an apparatus having a constitution as shown in FIG. 5 in European Patent Publication EP0391278A. In FIG. 5, the diffraction grating having a grating pitch d is moved at a velocity Vg as shown. A laser beam incident upon the moving diffraction grating is divided into diffracted lights 5a, 5b of the ±n-th order, which then undergo positive and negative Doppler shifts ±Vg/nd, respectively. The diffraction angle $\theta_0$ will satisfy:

$$\sin \theta_0 = \lambda/nd \qquad (5)$$

($\lambda$: wavelength of the light) If these two light fluxes of the ±n-th order are radiated onto the moving object 7 of the velocity V from the mirrors 6, 6' so that the incident angle may be $\theta_0$, the scattered lights from the measured object 7 undergo the Doppler shift by the amount of +(Vg+V)/nd for the +n-th order light 5 and −(Vg+V)/nd for the −n-th order light 5', and interfere each other, in which the Doppler frequency F is given by:

$$F = 2(Vg+V)/nd \qquad (6)$$

As a results, the Doppler frequency F is not dependent upon the wavelength of laser light. That is, even when the velocity of the measured object 7 is slow, the Doppler frequency can be sufficiently taken for a frequency difference with respect to low frequency components caused by the flow of speckle patterns or the variation of transmittance (or reflectance) of the measured object as previously described by the movement velocity Vg of the diffraction grating, and the output signal from the photodetector is passed through the high-pass filter to remove low frequency components electrically in order to pick up only the Doppler signal, whereby the detection of the velocity is enabled.

FIGS. 6A and 6B show the relation between the velocity V of the measured object and the Doppler frequency F in the laser Doppler velocimeter using the diffraction grating. FIG. 6A is an instance where the diffraction grating is fixed, FIG. 6B is an instance where the diffraction grating moves at the velocity Vg. As can be understood from FIG. 6A, even if a certain frequency F1 is detected, the movement direction can not be determined because two velocities $V_1$, $-V_1$ of different direction correspond. In FIG. 6B, the Doppler frequency F=Fg+F1 for the velocity $V_1$ and F=Fg−F1 for the velocity $-V_1$ are obtained, so that the direction of the velocity V can be detected. From the expression (6), the velocity V is represented by the expression:

$$V = F(d/2) - Vg \qquad (7)$$

Therefore, the velocity V of the expression (7) can be measured by detecting F when the movement velocity Vg of the diffraction grating is controlled.

SUMMARY OF THE INVENTION

The present invention is an improvement in the previously-described conventional example, and it is a first object of the invention is to provide a displacement information measuring apparatus not dependent on the wavelength of a light as previously described, in which acoustic optical means represented by AOM is used to give a frequency difference to two light fluxes, and the acoustic optical means is disposed in a simple form while maintaining the constitution independent of the wavelength of the light as previously described.

Other objects and features of the present invention will be apparent from the detailed description of embodiments of the present invention as will be described later.

BRIEF DESCRIPTION OF THE DRAWINGS

FIG. 3 is an explanation view of a diffraction grating.

DESCRIPTION OF THE PREFERRED EMBODIMENTS

An embodiment of the present invention will be described below, but first the Doppler shift which is a prerequisite for the measuring principle of the present invention will be mathematically described.

Figure 1:
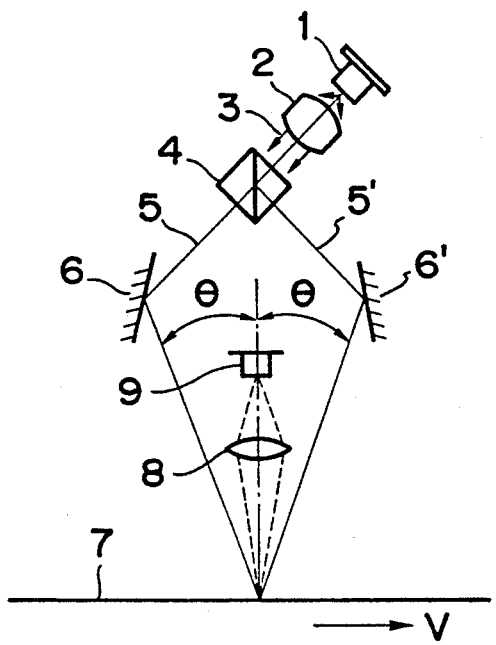
FIG. 1 is a view showing a conventional example of a laser Doppler velocimeter.
Figure 2:
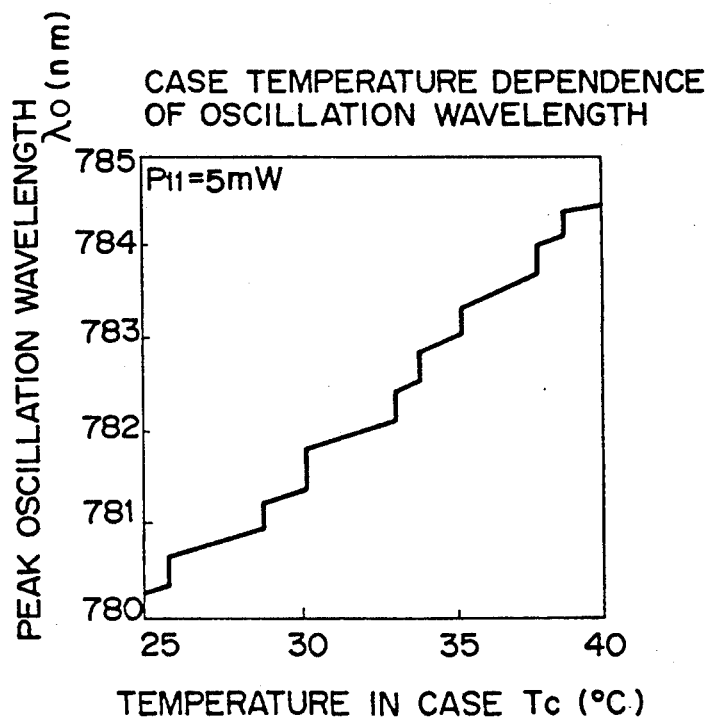
FIG. 2 is a graph showing one example of the temperature dependence of the oscillation frequency for a laser diode.
Figure 4:
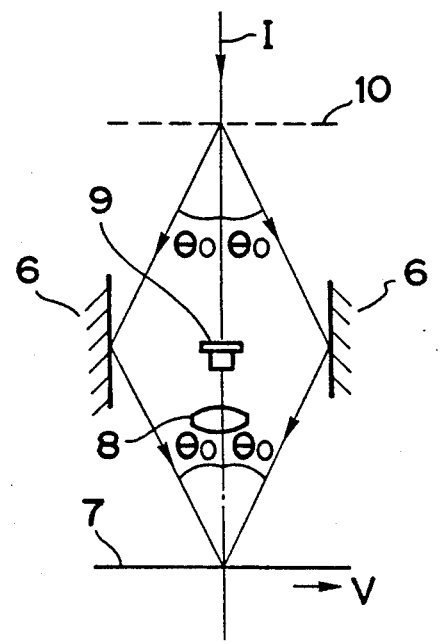
FIG. 4 is an explanation view of conventional laser Doppler velocimeter using the diffraction grating.
Figure 5:
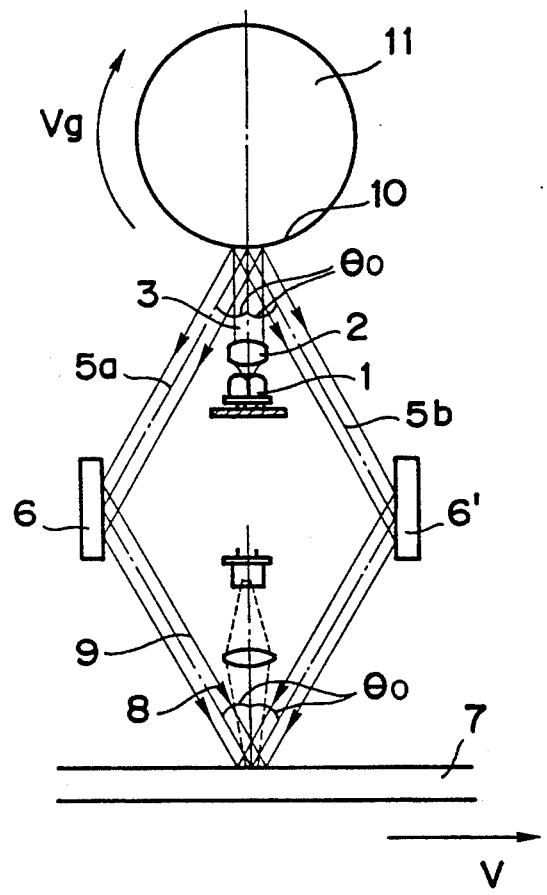
FIG. 5 is an explanation view of conventional laser Doppler velocimeter with diffraction grating moving type.
Figure 6A:
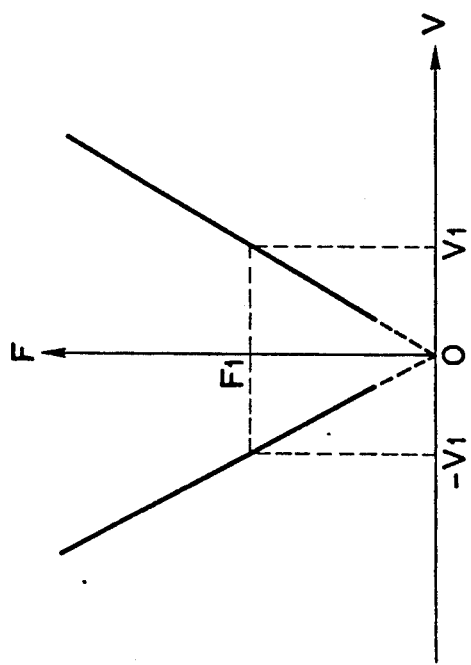
FIGS. 6A and 6B are graphs showing the relation between the velocity V of moving object and the Doppler frequency F.
Figure 6B:
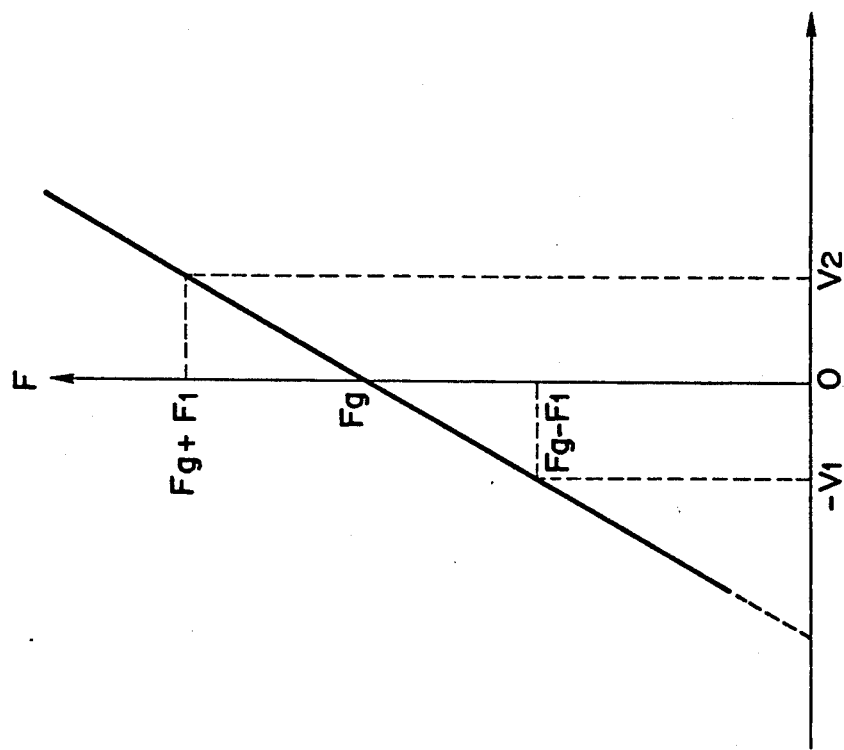
Figure 7:
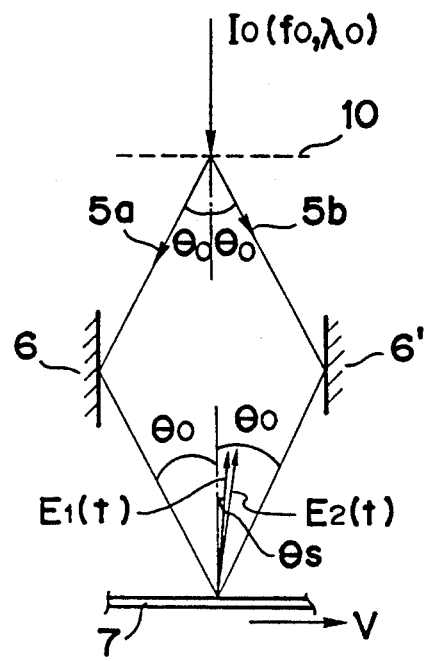
FIG. 7 is a view for explaining the light intensity and the output of photodetector as shown in FIG. 4.

FIG. 7 is a view for explaining the light intensity and the output of the photodector 9 as shown in FIG. 4, where $I_0$ is an incident light flux having a frequency $f_0$ and a wavelength $\lambda\sigma$. $E_1(t)$ and $E_2(t)$ show the scattered lights in which the diffracted lights $5a$, $5b$ from a diffraction grating 10 are radiated onto a moving object 7 and scattered at an inclination angle $\theta_s$ with respect to the optical axis, and they can be represented by the following expressions, respectively:

$$E_1(t)=A_1\exp[i\cdot 2\pi\{f_0+v/\lambda_0(\sin\theta_0-\sin\theta_s)\}t]$$

$$E_{12}(t)=A_2\exp[i\cdot 2\pi\{f_0-v/\lambda_0(\sin\theta_0++\sin\theta_s)\}t] \quad (8)$$

The output of the photodetector 9 is a mixture of $E_1(t)$ and $E_2(t)$, and is given by:

$$I(t)=A_1^2+A_2^2+2A_1A_2\cos(2\pi(2v\sin\theta/\lambda_0)t) \quad (9)$$

Hence, the frequency (Doppler frequency) of the output from the photodetector 9 can be represented by the following expression:

$$F=2V((\sin\theta_0)/\lambda_0) \quad (10)$$

Figure 8:
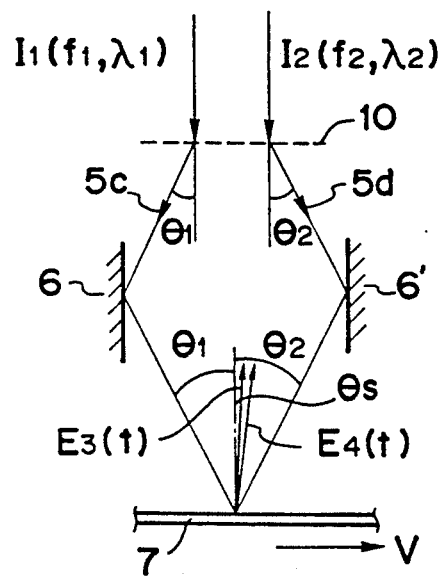
FIG. 8 is a view for explaining the principle of the present invention.

FIG. 8 is a view for explaining the measuring principle of the present invention, in which $I_1$ is a light flux having a frequency $f_1$ and a wavelength $\lambda_1$, and $I_2$ is a light flux having a frequency $f_2$ and a wavelength $\lambda_2$. $E_3(t)$ and $E_4(t)$ show the scattered lights in which the diffracted lights $5c$ and $5d$ from $I_1$ and $I_2$ vertically incident upon a diffraction grating 10 are radiated onto a moving object 7, and scattered at an inclination angle $\theta_s$ with respect to the optical axis, respectively, and they are represented by the following expressions:

$$E_3(t)=A_3\exp[i\cdot 2\pi\{f_1+v/\lambda_1(\sin\theta_1-\sin\theta_s)\}t]$$

$$E_4(t)=A_4\exp[i\cdot 2\pi\{f_2-v/\lambda_2(\sin\theta_2+\sin\theta_s)\}t] \quad (11)$$

Hence, the output of the photodetector 9 is given by:

$$I(t)=A_3^2+A_4^2+2A_3A_4\cos[2\pi\{\Delta f_0+v((\sin\theta_1)/\lambda_1+(\sin\theta_2)/\lambda_2)+v\sin\theta_s(1/\lambda_2-1/\lambda_1)\}t] \quad (12)$$

Hence, the Doppler frequency is given by:

$$F=\Delta f_0+v((\sin\theta_1)/\lambda_1+(\sin\theta_2)/\lambda_2)+v\sin\theta_s(1/\lambda_2-1/\lambda_1) \quad (13)$$

On the other hand, since $$(\sin\theta_1)/\lambda_1=(\sin\theta_2)/\lambda_2=n/d, \text{ and}$$

$$v\sin\theta_s(1/\lambda_2-1/\lambda_1)=(v/C)\sin\theta_s\cdot\Delta f_0 \approx 0$$

(C: light velocity)
$v\sin\theta_s(1/\lambda_2-1/\lambda_1)$ is ignorable, so that the following expression (14) can be obtained:

$$F=\Delta f_0+2nv/d \quad (14)$$

From the above, the velocity direction and the velocity near zero can be detected at high accuracy with a simple constitution.

Figure 9:
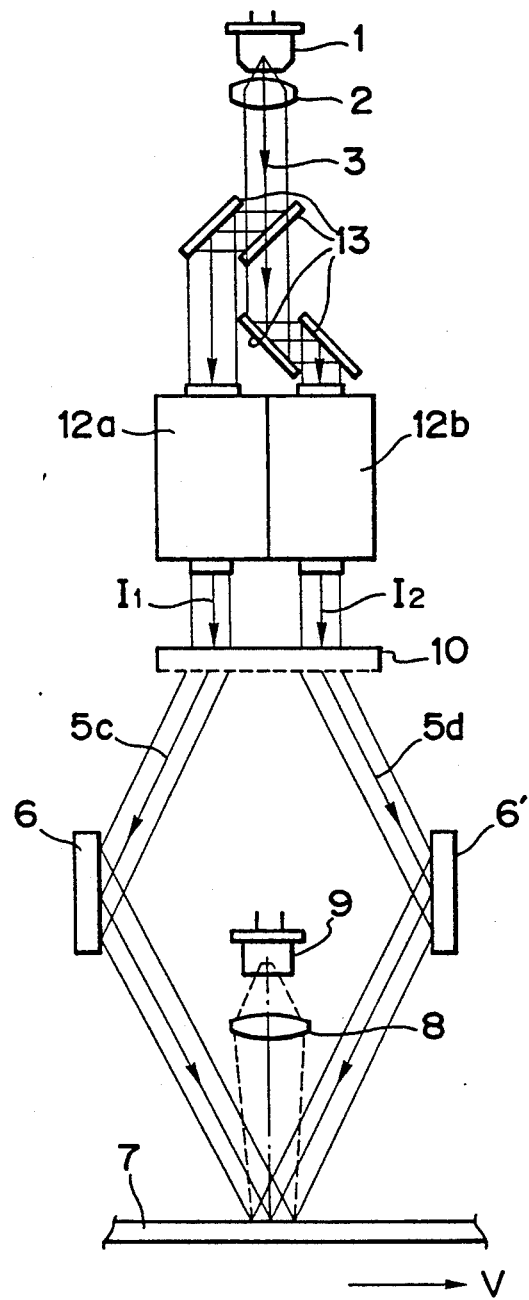
FIG. 9 is a view of an embodiment of the present invention.

Now, a specific example of the present invention will be described. FIG. 9 is a constitutional view of the embodiment according to the present invention. In FIG. 9, 12a, 12b are wavelength shifters, using acoustic optical devices in this embodiment. Each acoustic optical device has a characteristic of shifting the frequency of 40 MHz for 12a, and 41 MHz for 12b. A laser beam 3 (frequency $f_0$, wavelength $\lambda_0$) emitted from a laser diode 1 and rendered a parallel light via collimator lens 2 is divided into two light fluxes by means of a beam splitter optical unit 13 consisting of a half mirror and a total reflection mirror. The two light fluxes are led into the acoustic optical devices 12a, 12b, respectively. The frequencies of the light flux $I_1$ (frequency $f_1$, wavelength $\lambda_1$) emerging from the acoustic optical device 12a and the light flux $I_2$ (frequency $f_2$, wavelength $\lambda_2$) emerging from the acoustic optical device 12b are the frequency $f_0$ of the laser beam 3 by adding 41 MHz and 40 MHz, respectively, resulting in two light fluxes with the frequency different by a constant frequency ($\Delta f_0=f_1-f_2=1$ MHz).

The laser beams $I_1$ and $I_2$ are vertically radiated onto the diffraction grating 10 as the collimator light parallel to each other. The diffraction grating 10 is a blazed type, which is designed such that the laser beam $I_1$ and the laser beam $I_2$ may be efficiently converted into respective primary diffracted lights on the left side and the right side as viewed toward the drawing, respectively. The diffracted lights $5c$, $5d$ are reflected at the mirrors 6, 6', respectively, to be incident upon a moving object 7 at the same intersection angle as an angle made with each other when they are emergent from the diffraction grating. The scattered lights from the moving object 7 produced at this time are efficiently led through the focusing lens 8 into the photodetector 9. And the signal having a Doppler frequency F as represented in the following expression (15) which is made $n=1$ in the expression (14) is output:

$$F=\Delta f_0+2v/d \quad (15)$$

Since the acoustic optical device 12 has a very high operation stability, $\Delta f_0=1$ MHz is very stable. Hence, by detecting the Doppler frequency F, the velocity V as shown in the following expression (16) can be detected at high accuracy:

$$V=(f-\Delta f_0)xd/2 \quad (16)$$

With the above constitution, it is possible to sufficiently get a frequency difference with respect to low frequency components caused by the flow of speckle patterns or the variation of transmittance (or reflectance) of the moving object to detect the velocity by passing the output signal of the photodetector through the high-pass filter to remove low frequency components electrically in order to pick up only the Doppler signal. The absolute value on the right side of the expression (16) represents an absolute value of the velocity for the moving object 7, wherein the signs of ± indicate the movement direction. The electrical processing is performed by an electric circuit (not shown) which is connected to the photodetector 9.

In this way, this embodiment is provided with an illuminating unit for producing two different coherent light fluxes, a diffraction grating for forming first and second diffracted lights by diffracting the two light fluxes, an optical unit for causing the lights to be incident upon the moving object at the substantially same angle as an angle at which the first and second diffracted lights are emergent from the fiffraction grating, light receiving means for receiving scattered lights from the moving object irradiated by the first and second diffracted lights, and means for detecting the displacement information of the moving object based on the Doppler signal from the light receiving means.

Since an acoustic optical device is disposed at a position immediately before the position where the light flux is incident upon the diffraction grating so as to give a frequency difference to two light fluxes, the constitution not dependent upon the wavelength of the laser beam can be more easily made as compared with a case where it is disposed in the optical path after emerging from the diffraction grating. That is, since the acoustic optical device has a feature of deflecting the optical path (but in the figure, it is shown to emerge without deflection for simplicity), the constitution not dependent upon the wavelength of the laser beam as previously described must be made by adding the deflection angle when the acoustic optical device is disposed in the optical path after emerging from the diffraction grating, and thus is more complex. However, if it is disposed in the optical path before entering the diffraction grating as in this embodiment, the constitution not dependent upon the wavelength of the laser light as previously described can be made in the same way as the conventional one, and is easy. Further, an acoustic optical device for the frequency modulation and a diffraction grating (for making the constitution not dependent on the wavelength of the laser beam upon which the laser beam is vertically incident are separately provided, so that the freedom degree for the constitution not dependent on the wavelength of the laser beam is increased. That is, the diffraction angle for the constitution not dependent on the wavelength of the laser beam, i.e., the diffraction angle of the diffraction grating, may be determined by the constitution of the diffraction grating, and the deflection angle determined by the feature of the acoustic optical device for the frequency modulation does not have to be considered in this constitution, thereby forming the constitution more easily.

Figure 10:
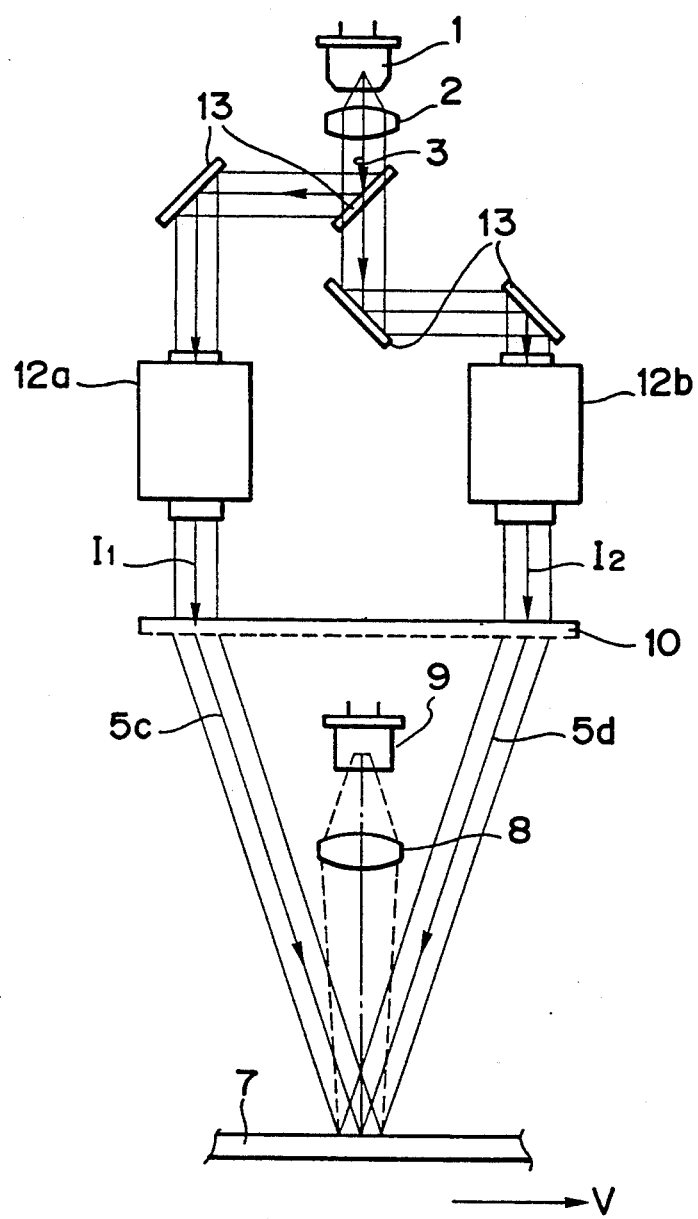
FIG. 10 is a view for explaining another embodiment of the present invention.

Next, another embodiment of the present invention will be described. FIG. 10 is a constitutional view of the another embodiment, wherein same numerals refer to same or like parts as in FIG. 9. The diffraction grating 10 is a blazed type, which is designed such that the laser beam $I_1$ and the laser beam $I_2$ may be efficiently converted into primary diffracted lights on the right side and the left side as viewed toward the drawing, respectively, unlike previous embodiment. The laser lights $5c$, $5d$ are incident upon the moving object 7 at the same intersection angle as that angle made with each other when they has directly emerged from the diffraction grating. The scattered lights from the moving object 7 are efficiently led through the focusing lens 8 into the photodetector 9, which outputs the signal having a Doppler frequency F as represented in the expression (15), like the previous embodiment, so that the same effects as in the previous embodiment can be obtained. In this embodiment, as the reflection mirrors 6, 6' are unnecessary, so that there is greater simplification as compared with the previous embodiment.

Note that in the above each embodiment, two acoustic optical devices are used to shift a difference between their frequencies, but the acoustic optical device may be diposed only in one optical path to form a light flux with the frequency shift made by the acoustic optical device and a light flux without the frequency shift, which are then radiated onto the diffraction grating. Also, other acoustic optical means may be used, rather than the acoustic optical device.

The above embodiments are apparatus for measuring the velocity of moving object, but if the velocity is integrated, the displacement can be obtained, allowing to use the apparatus as a displacement apparatus such as a so-called encoder.

In the above embodiments, the instance of detecting the surface velocity of moving object has been shown, but the present invention is also applicable to an instance where the velocity of small portion in the fluid is detected by narrowing two light fluxes and intersecting beam waists, as described in Europe Patent Publication EP0391278A, whereby the same effects can be obtained.

Figure 11:
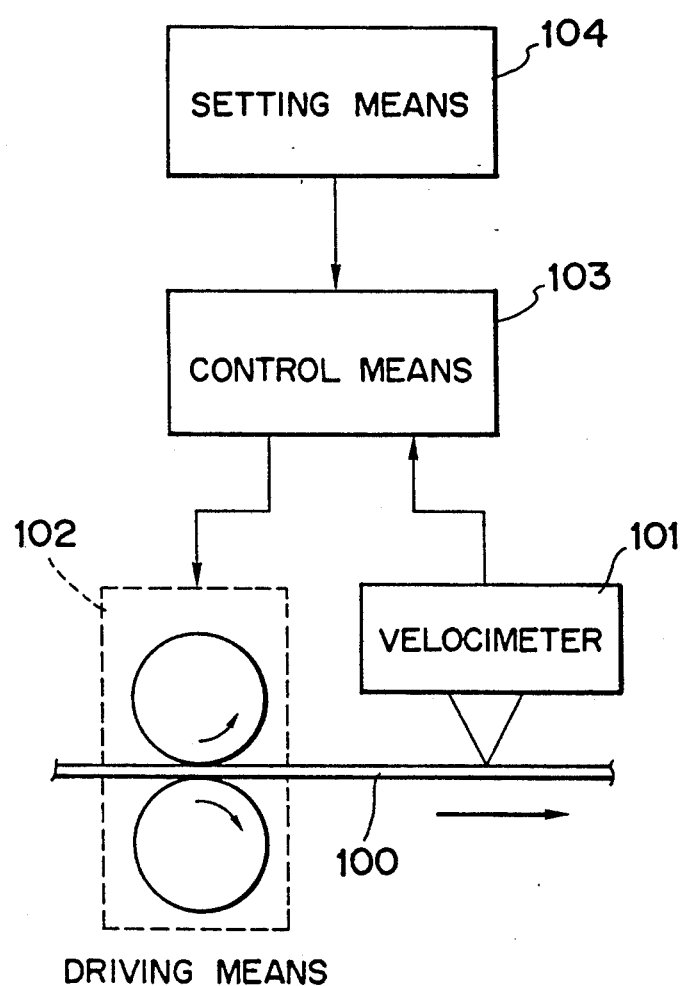
FIG. 11 is a system constitutional view of a driving system having a velocimeter shown in FIG. 9 or FIG. 10.

FIG. 11 shows one example of the system having the Doppler velocimeter as above described, and is a system constitutional view of a driving system having a velocimeter to be mainly used for an image recording apparatus and an image reading apparatus. The moving object 100 such as a sheet is moved by driving means 102 having a driving mechanism including a driving motor and a rotating roller. The movement velocity or movement amount of the moving object 100 is detected by the velocimeter 101 as above described. The detected output of this velocimeter is fed back to control means 103, which transmits a driving signal to the driving means 102 so as to be placed in the state set by setting means 104. By constituting such a feedback system, the moving object 100 can be moved as it has been set by the setting means 104. Such a driving system is applicable to various machine tools or manufacturing machines, measuring instruments, video/audio apparatuses, OA instruments, information apparatuses, and further all apparatuses having the driving mechanism.

As above described, with the above embodiments, it is possible to measure the displacement at high accuracy and to detect the direction with a simple constitution, even if the moving object moves at a low speed.

What is claimed is:

1. A displacement information measuring apparatus comprising:

light generating means for generating two light fluxes;

acoustic optical means which modulate each of the two light fluxes independently, for giving a predetermined frequency difference to the two light fluxes from the light generating means;

optical means including a diffraction grating upon which the two light fluxes having the predetermined frequency difference given by the acoustic optical means are incident so that said light fluxes are diffracted and emerged, said optical means causing said light fluxes from said diffraction grating to be incident upon an object in which the displacement information is to be measured, and said two light fluxes emergent from said acoustic optical means being incident upon said optical means in parallel condition to each other; and detecting means for performing a detection by interference of one light flux incident upon said object and emergent from said object with the other of said two light fluxes incident upon said object and emergent from said object, the displacement information of said object being obtained from a beat signal corresponding to the frequency difference and obtained from said detecting means, wherein said optical means is constituted such that a frequency of the beat signal may not be substantially affected by a variation of wavelength of the light fluxes incident upon the diffraction grating.

2. An apparatus according to claim 1, wherein said optical means is constituted such that each light flux may be incident upon said object at an incident angle of the same angle as an emergent angle of said light flux from said diffraction grating.

3. An apparatus according to claim 2, wherein said optical means includes a mirror for reflecting each light flux so that said each light flux may be incident upon said object at an incident angle of the same angle as an emergent angle of said each light flux from said diffraction grating.

4. An apparatus according to claim 1, wherein said diffraction grating diffracts said light fluxes so that each light flux may be incident upon said object at an incident angle of the same angle as an emergent angle of said each light flux from said diffraction grating.

5. A displacement information measuring apparatus comprising:
a light source;
a beam splitter optical system for forming two light fluxes from a light emitted by said light source;
two acoustic optical devices which modulate respective ones of the two light fluxes, for giving respective predetermined frequency differences to said two light fluxes from said beam splitter optical system;
an intersecting optical system for permitting to intersect said two light fluxes of different frequency from said two acoustic optical devices near an object in which a displacement information is to be measured, said intersecting optical system including a diffraction grating upon which said two light fluxes of different frequency are incident so that said two light fluxes are diffracted, said intersecting optical system permitting to intersect two diffracted lights generating from said diffraction grating in correspondence to said two light fluxes, respectively, near said object to be measured, said two light fluxes emergent from said acoustic optical devices being incident upon said intersecting optical system in parallel condition to each other; and
a light receiving device for detecting a light from said object upon which the two diffracted lights are caused to be incident by said intersecting optical system, the displacement information of said object being obtained from a beat signal corresponding to said frequency difference and obtained from said light receiving device,
wherein said intersecting optical system is constituted such that a frequency of said beat signal may not be substantially affected by a variation of wavelength of the light fluxes incident upon said diffraction grating.

6. An apparatus according to claim 5, wherein said intersecting optical system includes a mirror for reflecting said two diffracted lights so that said two diffracted lights may be incident upon said object at an intersection angle of the same angle as an emergent angle of said light flux from said diffraction grating.

7. An apparatus according to claim 5, wherein said diffraction grating diffracts said light flux so that said two diffracted lights may be intersected near said object.

8. An apparatus according to claim 5, wherein the displacement information from the beat signal obtained by said light receiving device is a velocity of said object.

9. An apparatus according to claim 5, wherein said diffraction grating is a blazed-type diffraction grating.

10. A driving system comprising:
a driving unit;
a detecting unit, the detecting unit including;
(1) a light source;
(2) a beam splitter optical system for forming two light fluxes from a light emitted by said light source;
(3) two acoustic optical devices which modulate respective ones of the two light fluxes, for giving respective predetermined frequency differences to said two light fluxes from said beam splitter optical system;
(4) an intersecting optical system for permitting to intersect said two light fluxes of different frequency from said two acoustic optical devices near an object in which the displacement information is to be measured, said intersecting optical system including a diffraction grating upon which said two light fluxes of different frequency are incident so that said two light fluxes are diffracted, said intersecting optical system permitting to intersect two diffracted lights generating from said diffraction grating in correspondence to said two light fluxes, respectively, near the object to be measured, said two light fluxes emergent from said acoustic optical devices being incident upon said intersecting optical system in parallel condition to each other; and
(5) a light receiving device for detecting a light from said object upon which two diffracted lights are caused to be incident by said intersecting optical system, the displacement information of said object being obtained from a beat signal corresponding to said frequency difference and obtained from said light receiving device;
wherein said intersecting optical system is constituted such that a frequency of said beat signal may not be substantially affected by variation of wavelength of the light fluxes incident upon said diffraction grating; and
a control unit for controlling said driving unit based on the displacement information obtained by said detecting unit.

11. An apparatus according to claim 1, wherein the displacement information from the beat signal obtained by said detecting means is a velocity of said object.

12. A displacement information measuring apparatus comprising:
a light source;
a beam splitting optical system for forming two light fluxes from a light emitted by said light source;
two acoustic optical devices which modulate respective ones of the two light fluxes for giving a respective predetermined frequency difference to said two light fluxes from said beam splitting optical system;

an intersecting optical system for permitting to intersect said two light fluxes of two different frequencies from said two acoustic optical devices, said intersecting optical system including a diffraction grating upon which said two light fluxes of different frequency are incident so that said two light fluxes are diffracted, said intersecting optical system permitting to intersect two diffracted lights generating from said diffraction grating in correspondence to said two light fluxes, respectively, near an object to be measured at the same intersection angle as an angle made with each other when they are emergent from said diffraction grating substantially independently of a variation of wavelength of the light fluxes incident upon said diffraction grating, said two light fluxes emergent from said acoustic optical devices being incident upon said intersecting optical system in parallel condition to each other; and a light receiving device for detecting a light from said object upon which the two diffracted light fluxes are caused to be incident by said intersecting optical system, the displacement information of said object being obtained on the basis of detection of said light receiving device.

13. An apparatus according to claim 12, wherein the displacement information being obtained on the basis of detection of said light receiving device is a velocity of said object.

14. An apparatus according to claim 12, wherein said diffraction grating is a blazed type which is designed such that two diffracted light fluxes for being intersected near the object by said intersecting optical system may be efficiently diffracted.

15. An apparatus according to claim 12, wherein said diffraction grating is arranged such that two diffracted light fluxes are intersected near the object by said intersecting optical system directly from said diffraction grating.

* * * * *

UNITED STATES PATENT AND TRADEMARK OFFICE
CERTIFICATE OF CORRECTION

PATENT NO. : 5,327,222
DATED : July 5, 1994
INVENTOR(S) : MAKOTO TAKAMIYA, ET AL.

It is certified that error appears in the above-identified patent and that said Letters Patent is hereby corrected as shown below:

ON TITLE PAGE

In [19] "Takamiya: Makoto et al." should read --Takamiya et al.--

In [75] Inventors: "Takamiya: Makoto" should read --Makoto Takamiya--; "Kadowaki: Hidejiro" should read --Hidejiro Kadowaki--; and "Ishida: Yasuhiko" should read --Yasuhiko Ishida--.

IN THE DRAWINGS

Sheet 2 of 8, FIG. 4 "∫6" should read --∫6'--.

COLUMN 1

Line 20, "(thereinafter" should read --(hereinafter--.
Line 61, "(thereinafter" should read --(hereinafter--.

COLUMN 2

Line 36, "(thereinafter" should read --(hereinafter--.

COLUMN 3

Line 50, "light)" should read --light).--.
Line 57, "interfere" should read --interfere with--.
Line 62, "results," should read --result,--.

COLUMN 4

Line 32, "is" should be deleted.

UNITED STATES PATENT AND TRADEMARK OFFICE
CERTIFICATE OF CORRECTION

PATENT NO. : 5,327,222
DATED : July 5, 1994
INVENTOR(S) : MAKOTO TAKAMIYA, ET AL.

It is certified that error appears in the above-identified patent and that said Letters Patent is hereby corrected as shown below:

COLUMN 5

Line 22, "$E_{12}(t)$" should read --$E_2(t)$--.
Line 27, "$(2y \sin \theta/\lambda_o)$" should read --$(2v \sin \theta/\lambda_o)$--.
Line 66, "$v \sin \theta_s (1/\lambda_2 - 1/\lambda_2)$" should read --$v \sin \theta_s (1/\lambda_2 - 1/\lambda_1)$--.

COLUMN 7

Line 36, "(for" should read --for--.

COLUMN 10

Line 17, "including;" should read --including:--.

Signed and Sealed this

Fourteenth Day of February, 1995

Attest:

BRUCE LEHMAN

Attesting Officer

Commissioner of Patents and Trademarks